United States Patent [19]
Anliker et al.

[11] 3,755,343
[45] Aug. 28, 1973

[54] 4-AROTRIAZOLYL-4'-AROXAZOLYL DIPHENYL DERIVATIVES

[75] Inventors: Rudolf Anliker; Peter Liechti, both of Binningen, Switzerland

[73] Assignee: Ciba-Geigy AG., Basle, Switzerland

[22] Filed: June 16, 1970

[21] Appl. No.: 46,824

[30] Foreign Application Priority Data
June 27, 1969 Switzerland.......................... 9868/69

[52] U.S. Cl. ...................... 260/307 D, 252/301.2 W
[51] Int. Cl. ............................................. C07d 85/48
[58] Field of Search .................................. 260/307 D

[56] References Cited
UNITED STATES PATENTS
3,058,989   10/1962   Buell et al........................... 260/296

*Primary Examiner*—Alex Mazel
*Assistant Examiner*—R. V. Rush
*Attorney*—Harry Goldsmith, Joseph G. Kolodny and Mario A. Monaco

[57] ABSTRACT
Compounds of the formula

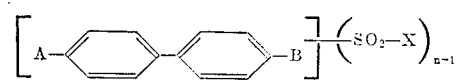

wherein A denotes a benztriazole, naphthotriazole or acenaphthotriazole radical, B denotes a benzoxazole radical which may contain a condensed-on six-membered carbocyclic ring and wherein the radical A and B may contain substituents, such as halogen, halogenalkyl, alkyl, alkoxy, alkoxyalkyl, aminoalkyl, phenylalkyl, phenyl, carboxylic ester group, cyclohexyl or cyano. In the above formula $n$ is an integer from 1 to 5 and X represents an optionally substituted amino group or a group —OM, wherein M denotes hydrogen or a salt-forming cation. Said compounds are valuable optical brightening agents.

2 Claims, No Drawings

4-AROTRIAZOLYL-4'-AROXAZOLYL DIPHENYL DERIVATIVES

The present invention relates to new 4-arotriazolyl-4'-aroxazolyl-diphenyl derivatives, their manufacture and their use as optical brighteners.

The new compounds of the type described above correspond to the formula

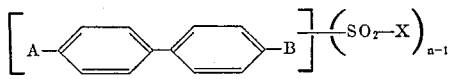

wherein A denotes a radical

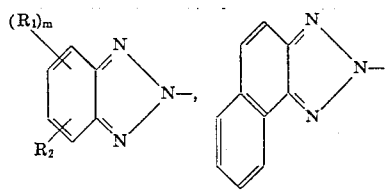

or

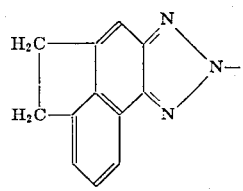

and B denotes a radical

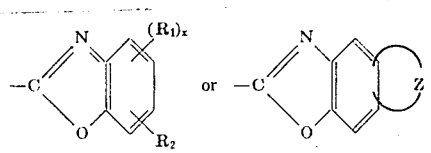

wherein Z denotes a fused six-membered carbocyclic ring, $R_1$ denotes hydrogen or mutually similar or different substituents of the series halogen, halogenalkyl, alkyl, alkoxy, alkoxyalkyl, and optionally quaternised aminoalkyl, $R_2$ denotes hydrogen, alkyl, phenylalkyl, phenyl, carbalkoxy, a carboxylic acid phenylalkyl ester group, carbalkoxyalkyl, cyclohexyl or nitrile, $x$ represents an integer from 1 to 4, $m$ is 1 or 2, $n$ is an integer from 1 to 5 and X represents an optionally substituted amino group or a group -OM, wherein M denotes hydrogen or a salt-forming cation.

Within the framework of the above formula, compounds of formula (1a) are above all of interest

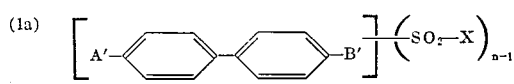

with A' in this formula denoting a radical

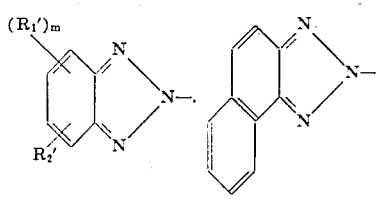

or

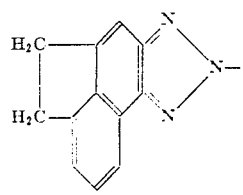

and $B_1'$ denoting a radical

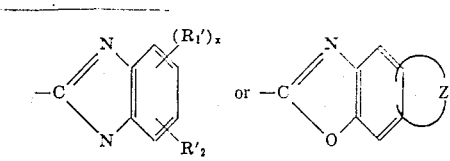

wherein Z denotes a fused 6-membered carbocyclic ring, $R_1'$ denotes hydrogen, halogen, alkyl or alkoxy, and $R_2'$ denotes hydrogen, alkyl, phenylalkyl, phenyl, carbalkoxy, carbalkoxyalkyl or nitrile, with $m$ representing the numbers 1 or 2, $n$ representing an integer from 1 to 5, $x$ representing an integer from 1 to 4 and X representing an optionally substituted amino group or a group —OM, wherein M denotes hydrogen or a salt-forming cation.

In these formulae Z means that either a fused tetramethylene ring or fused benzene rings can be present in the three possible positions. Within the framework of the definition given under $R_1$ and $R_2$, the following are of practical interest: chlorine as halogen, the chloromethylation products as halogenalkyl, alkyl groups with up to 18, preferably up to 8, carbon atoms, alkoxy groups with 1 to 4 carbon atoms, alkoxyalkyl with up to 18 carbon atoms, aminoalkyl groups with up to 12 carbon atoms in the basic alkyl group (that is to say the amino group in turn can be additionally alkylated, preferably with 1 to 4 carbon alkyl groups, or quaternised with customary quaternising agents), phenylalkyl with 1 to 4 carbon atoms in the alkyl part, and carbalkoxy and carbalkoxyalkyl groups each with up to 12 carbon atoms.

As salt-forming cations under M, the ammonium and amine salt ion (trialkanolamine or pyridine salts and the like) should be mentioned in addition to alkali and alkaline earth ions.

The sulphonamide group defined under the sulphone function can be both an unsubstituted and a substituted group (for example alkylamide, morpholide and the like).

As groups of compounds of preferred significance, the following types should be mentioned:

a. diphenyl derivatives of formula

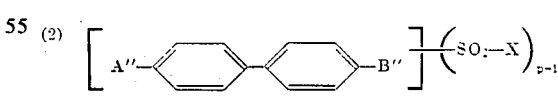

wherein A'' denotes a radical

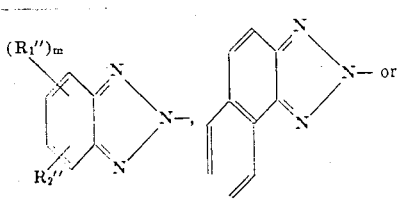

or

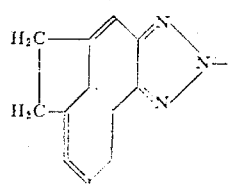

and B″ denotes a radical

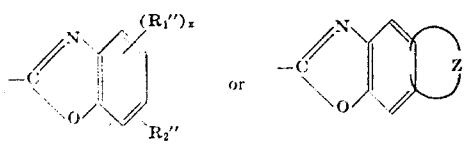

wherein Z denotes a fused six-membered carbocyclic ring, $R_1''$ denotes hydrogen or similar or different substituents of the series of halogen, alkyl with 1 to 18 carbon atoms or alkoxy with 1 to 8 carbon atoms, $R_2''$ denotes hydrogen, alkyl with 1 to 4 carbon atoms, phenylalkyl with 1 to 4 carbon atoms in the alkyl part, phenyl, carbalkoxy with 1 to 12 carbon atoms or carbobenzyloxy, carbalkoxyalkyl with 1 to 12 carbon atoms, cyclohexyl or nitrile, m represents the numbers 1 or 2 and x represents the numbers 1 to 4, p represents an integer from 1 to 3 and X represents a group —OM, wherein M denotes hydrogen or a salt-forming cation.

b. Compounds of formula

c. those of formula

wherein, in these formulae, $A_1$ denotes a radical

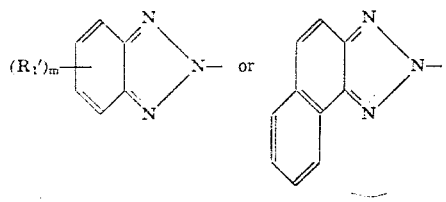

and $B_1$ denotes a radical

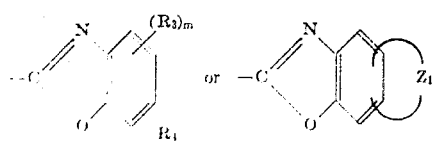

wherein $R_1'$ represents hydrogen, halogen, alkyl or alkoxy, $Z_1$ represents a fused benzene ring, $R_3$ represents hydrogen, halogen, alkyl with 1 to 8 carbon atoms or alkoxy with 1 to 8 carbon atoms, $R_4$ represents hydrogen, alkyl with 1 to 4 carbon atoms or phenyl, m represents 1 or 2, n represents an integer from 1 to 5 and M represents hydrogen or a salt-forming cation.

c. Diphenyl derivatives of formula

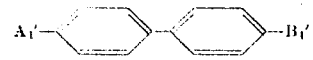

wherein $A_1'$ denotes a radical

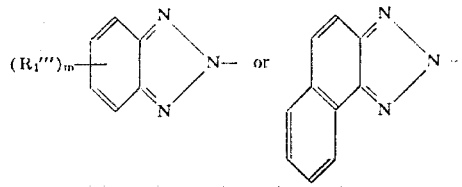

and $B_1'$ denotes a radical

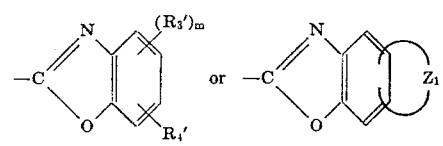

wherein $R_1'''$ represents hydrogen, halogen, alkyl with 1 to 4 carbon atoms or alkoxy with 1 to 4 carbon atoms, $Z_1$ represents a fused benzene ring, $R_3'$ represents hydrogen, halogen, alkyl withh 1 to 8 carbon atoms and alkoxy with 1 to 4 carbon atoms, $R_4'$ represents hydrogen, alkyl with 1 to 4 carbon atoms, phenylalkyl with 1 to 4 carbon atoms in the alkyl part or a carbalkoxy group with 1 to 8 carbon atoms and m represents the numbers 1 or 2.

d. An interesting sub-group of compounds according to formula (1) is finally defined by the formula

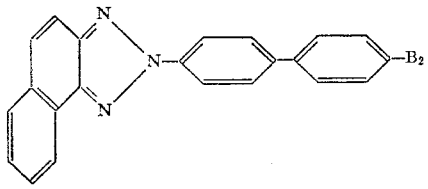

wherein $B_2$ represents a radical

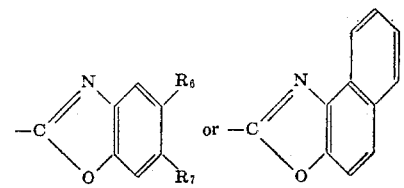

wherein $R_6$ represents hydrogen, alkyl with 1 to 4 carbon atoms, alkoxy with 1 to 4 carbon atoms, and $R_7$ represents hydrogen, alkyl with 1 to 4 carbon atoms, alkoxy with 1 to 4 carbon atoms or phenyl.

The following may be quoted as examples of compounds according to the invention:

(7) 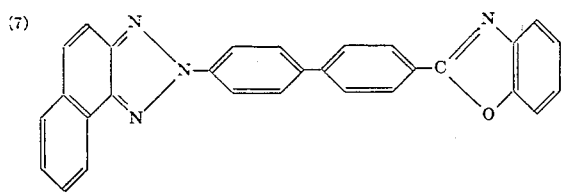
(8) 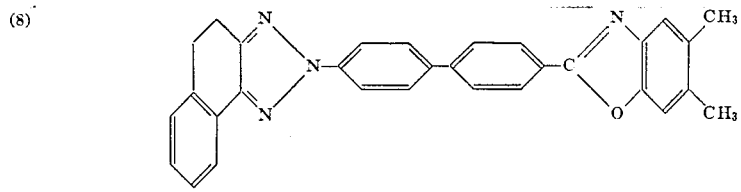
(9) 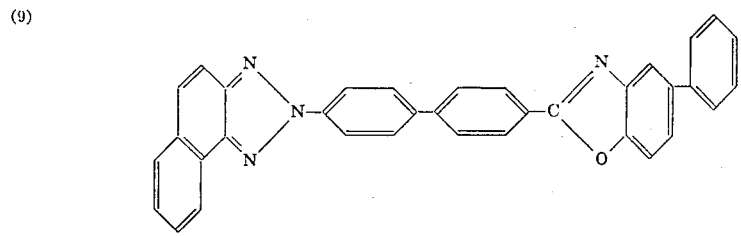
(10) 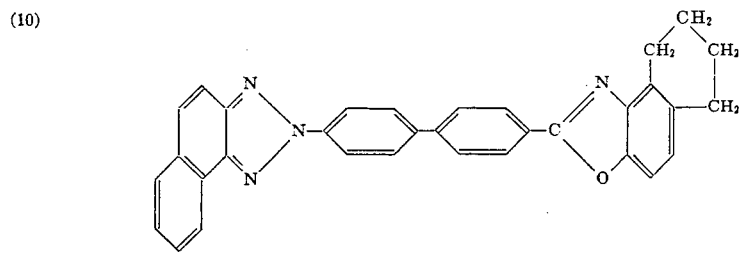
(11) 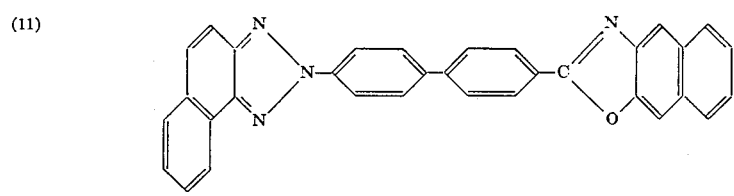
(12) 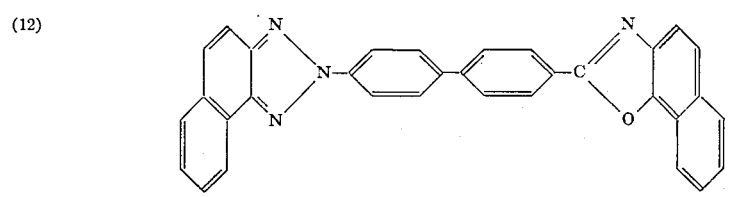
(13) 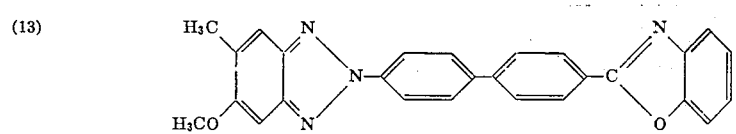
(14) 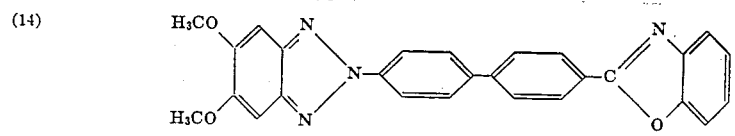
(15) 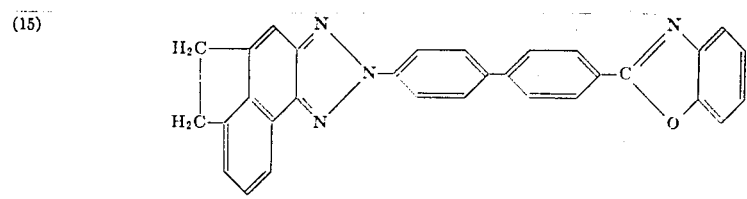

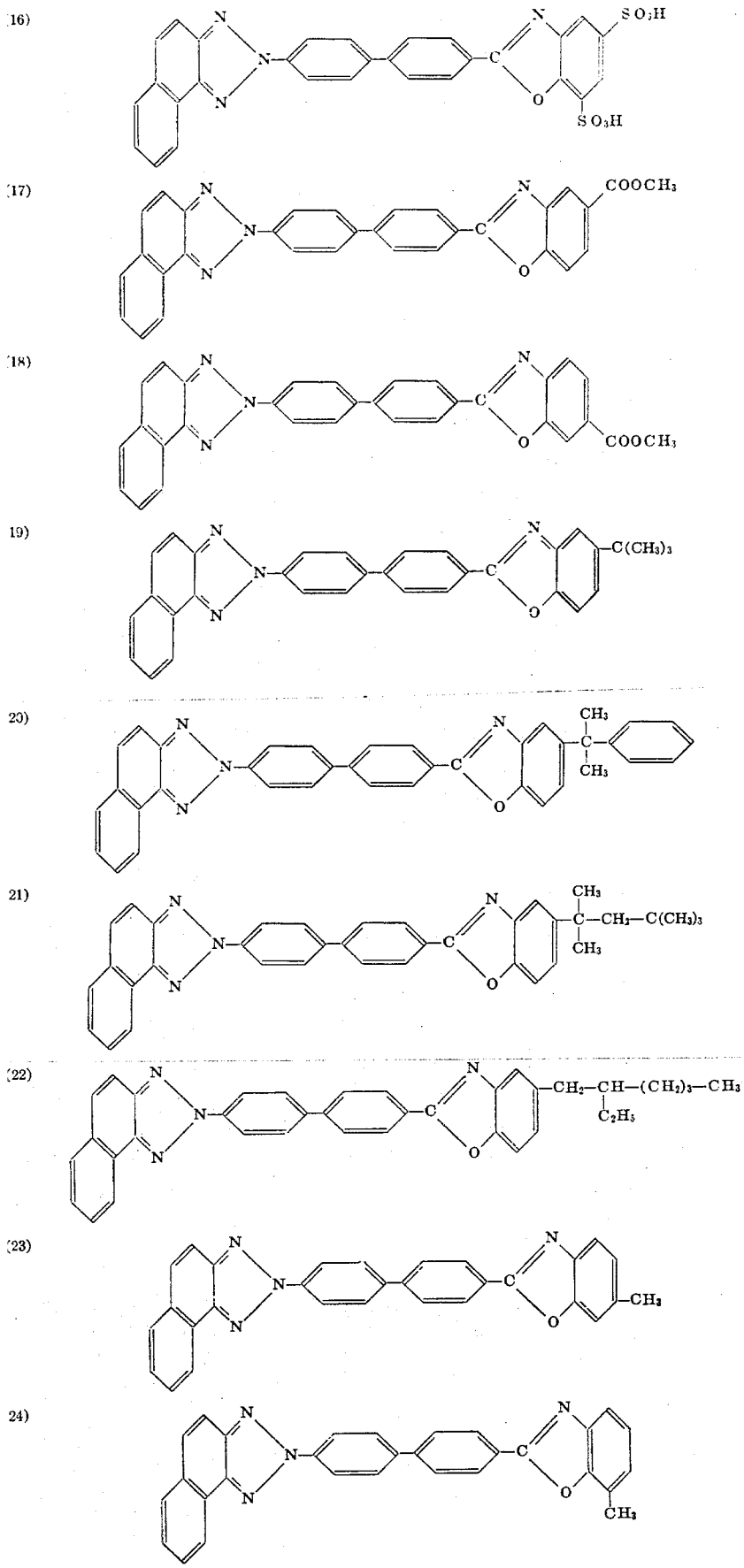

(25) 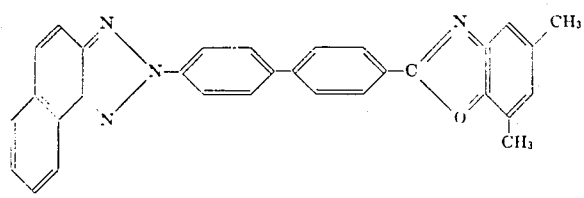
(26) 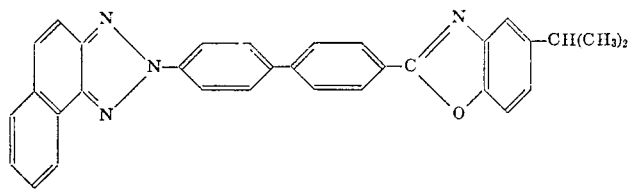
(27) 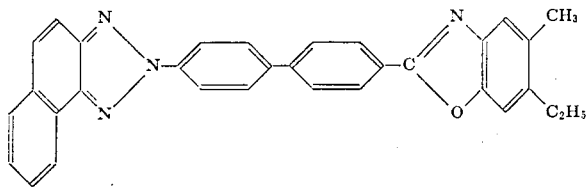
(28) 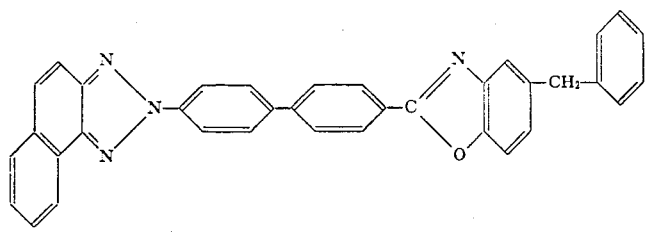
(29) 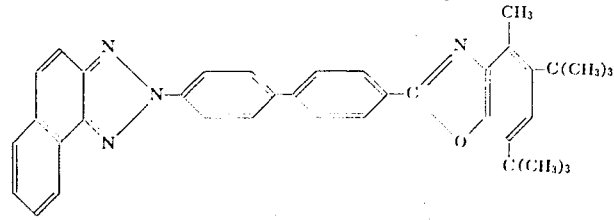
(30) 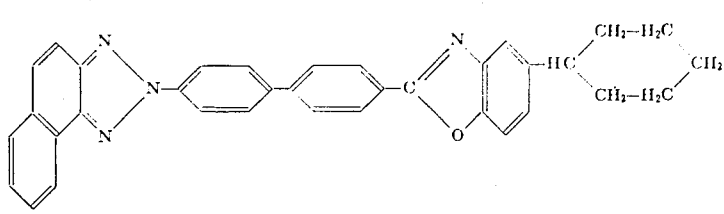
(31) 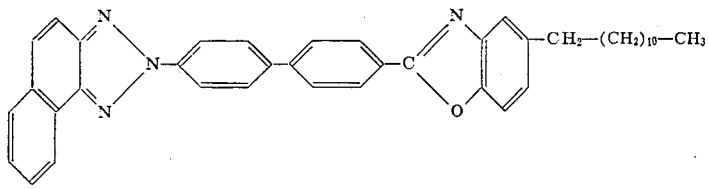
(32) 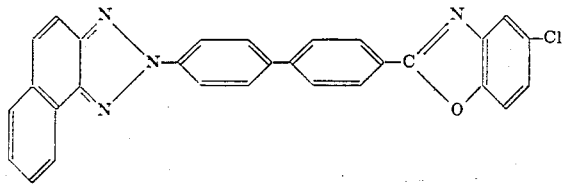
(33) 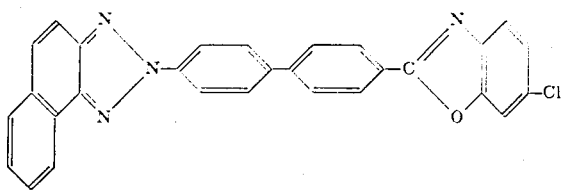

34)
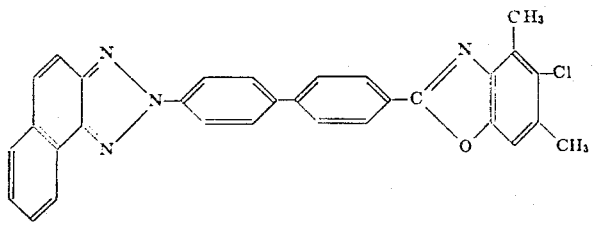
35)
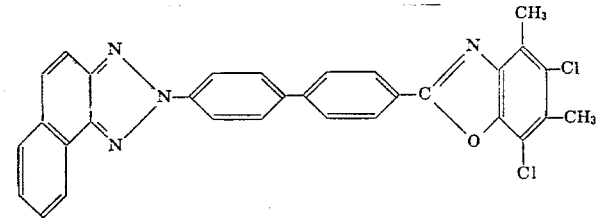
36)
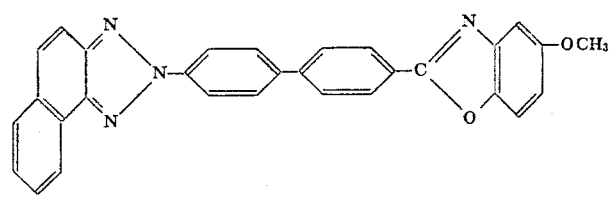
37)
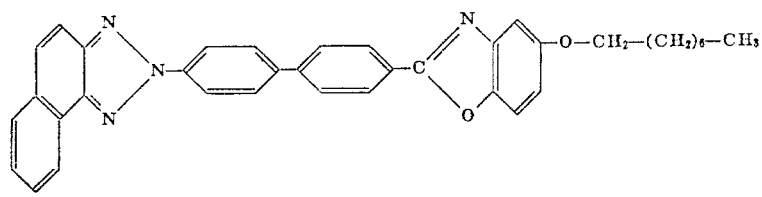
38)
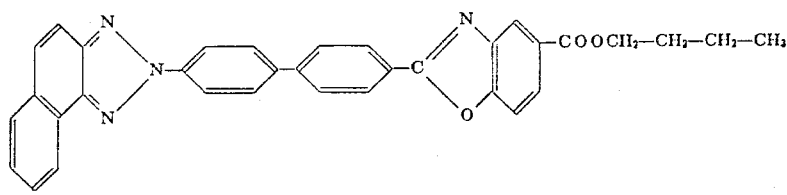
39)
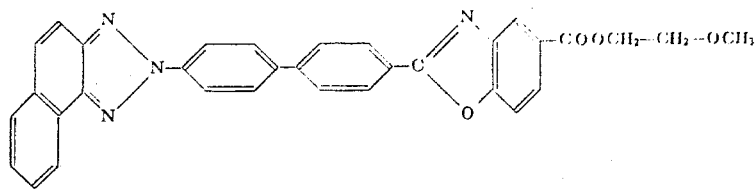
40)
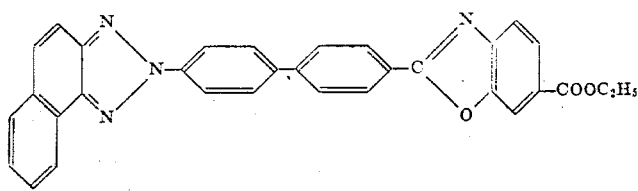
41)
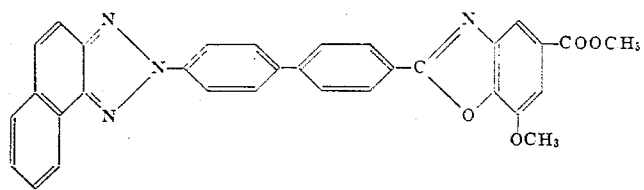

(42) 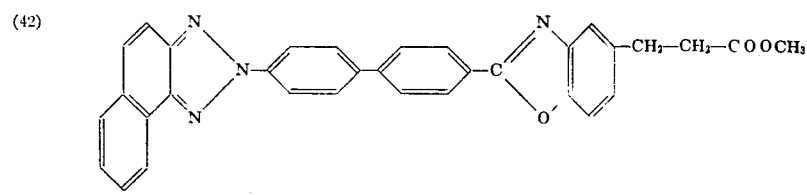
(43) 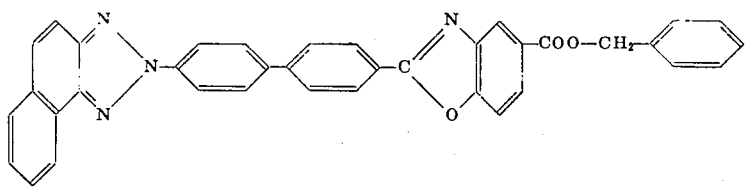
(44) 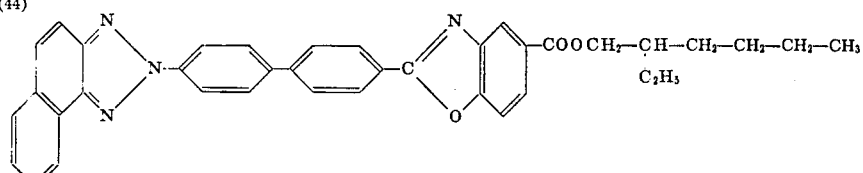
(45) 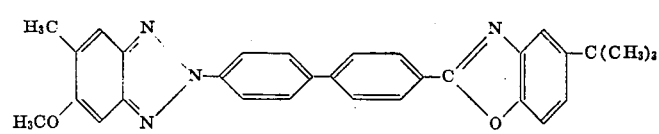
(46) 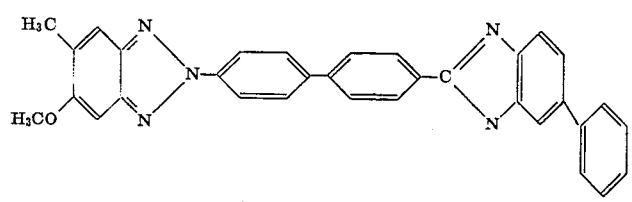
(47) 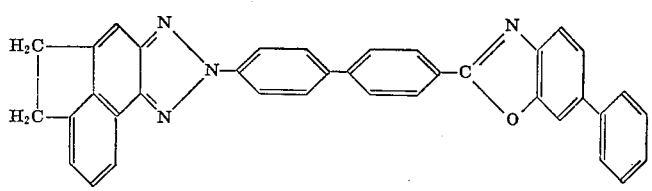
(48) 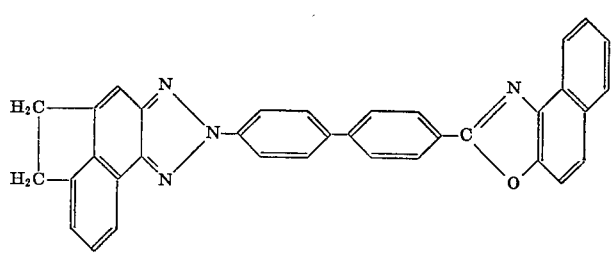
(49) 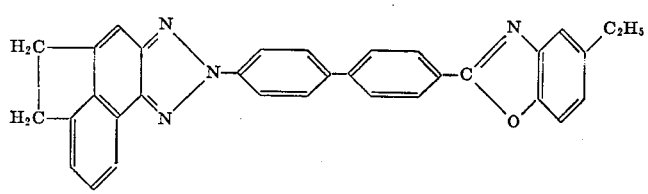
(50) 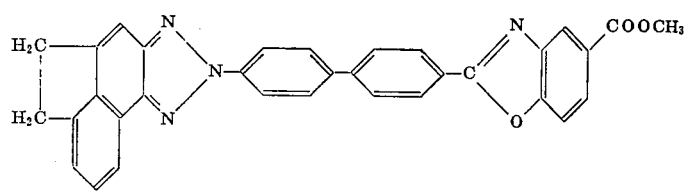

(51) 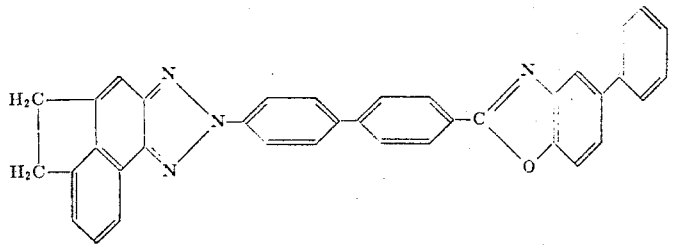

(52) 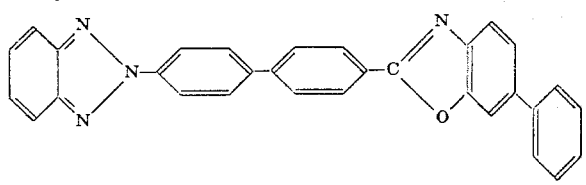

(53) 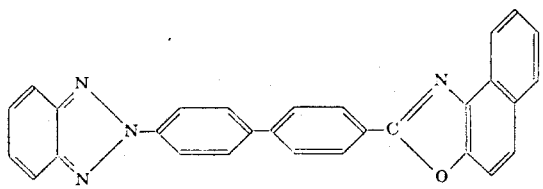

(54) 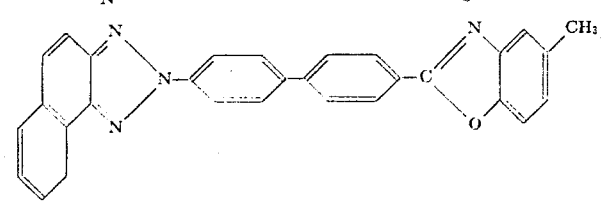

(55) 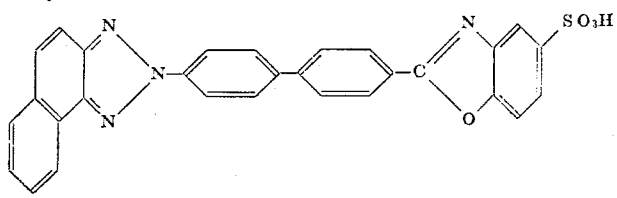

The compounds defined above can be manufactured analogously to processes which are in themselves known. Compounds according to formula (1) — and, in a corresponding sense, those of the formulae subordinate to formula (1) — can for example be obtained if firstly aminocarboxylic acids of formula

(56) 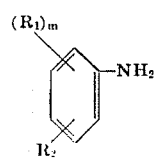

are diazotised in an aqueous medium and coupled with an amine of formula

(57) 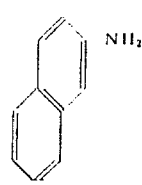

or

(58) 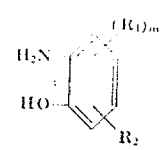

(59) 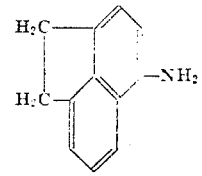

and cyclisation is effected with oxidation to give the triazole compound of formula

(60) 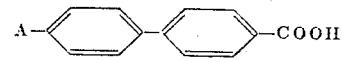

The coupling of the diazotised carboxylic acid is effected according to known methods, for example in aqueous pyridine solution, and oxidation to the triazole compound is for example effected with alkali hypochlorites or with air in the presence of copper-(II) salts (copper sulphate), lead oxide and the like.

In a second stage, the acid of formula (60) is condensed in a manner which is in itself known, optionally after conversion into the corresponding acid halide, with an aminophenol of formula (61)

or (62)

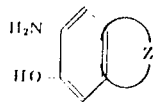

and subjected to a cyclisation reaction to give the oxazole ring under conditions under which water is eliminated.

The oxazole cyclisation reaction is here generally carried out at temperatures of above 100° C, in the presence of catalysts for eliminating water. It can, in particular, be effected by heating the components together to higher temperatures, appropriately between 120° and 350° C, in an inert gas (for example a stream of nitrogen). This reaction is preferably carried out in the presence of agents for eliminating water in the same manner as described above for the end stage. In the case where $n>1$, that is to say where sulphonic acid functions are present, sulphonic acid groups can be present from the start, that is to say both in the amine component and in the aminophenol component, by using the corresponding sulphonic acids as starting materials. This means in practice that instead of the compounds (57), (58), (61) and (62) the corresponding sulphonic acids of formulae (63), (64), (65), (66) or (67) are employed:

(63)

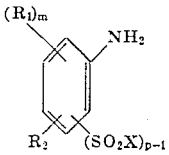

(wherein p = 2 or 3)

(64)

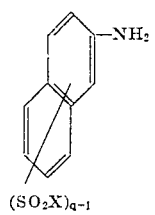

(wherein q = 2, 3 or 4)

(65)

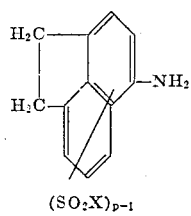

(wherein p = 2 or 3) or (66)

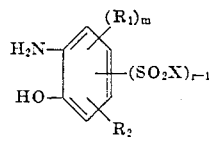

(wherein r = 2 or 3)

(67)

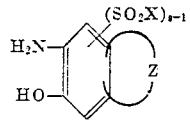

(wherein s = 2, 3 or 4)

The condition that, $p$, $9$, $r$ or $s = n$ applies to the indices.

On the other hand it is also possible, namely when $n$, $p$, $q$, $r$ and $s$ each $= 1$, for an after-sulphonation to be carried out with customary sulphonating agents such as oleum, or sulphochlorinating agents such as sulphonyl chloride.

It is for example possible to carry out the process in two stages, by first condensing o-aminophenols of formula (61) or (62) and the compounds of formula (60) to give the corresponding acyl compound. Appropriately, the corresponding carboxylic acid chlorides are here used, these being condensed with the aminophenols in the presence of an organic solvent such as toluene, xylenes, chlorobenzene, dichlorobenzene, trichlorobenzene or nitrobenzene at temperatures of between 100° and 220° C, and the resulting acyl compounds then converted at temperatures of between 120° and 350° C, optionally in the presence of a catalyst, into the azole derivatives. If carboxylic acid chlorides are used as starting substances, then these can be manufactured immediately before the condensation with the o-amino compound, and without isolation, from the free carboxylic acid and thionyl chloride, optionally with the addition of a catalyst, such as pyridine, in the solvent in which the condensation subsequently takes place.

Suitable agents for eliminating water — including catalysts having a water-eliminating effect — are for example boric acid, boric anhydride, zinc chloride, p-toluenesulphonic acid and also polyphosphoric acids, including pyrophosphoric acid. If boric acid is used as the catalyst, this acid is advantageously used in an amount of 0.5 to 5 percent relative to the total weight of the reaction mass. It is also possible conjointly to use high-boiling, polar, organic solvents, such as for example dimethylformamide, dichlorobenzene, trichlorobenzene and aliphatic, optionally etherified hydroxy compounds, for example propylene glycol, ethylene glycol monoethyl or diethylene glycol diethyl ether, and high-boiling esters of phthalic acid, such as for example phthalic acid dibutyl ester.

A particularly advantageous process for the oxazole cyclisation for example consists of subjecting the acyl compounds obtained by condensation of the o-aminophenol of formula (61) or (62) with the carboxylic acid dichloride of the acid of formula (60) in the presence of agents for eliminating water, without isolation, to an azole cyclisation reaction by treatment with the same agent for eliminating water as used in the preliminary stage, at temperatures between 120° and 350° C.

Another manufacturing process variant consists of reducing a nitro compound of formula (68)

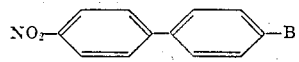

diazotising the product and coupling it with an amine as indicated under formulae (57), (58) or (59), and carrying out the cyclisation with oxidation. As regards the introduction of sulphonic acid functions, what has been stated earlier applies analogously here.

Compounds of formula (2) can be manufactured in an entirely analogous manner if the aminocarboxylic acid of formula (56)

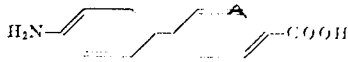

s diazotised an an aqueous medium and coupled with an amine of formula

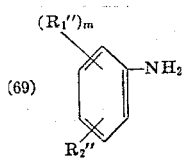
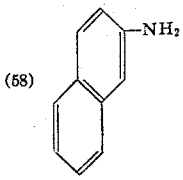

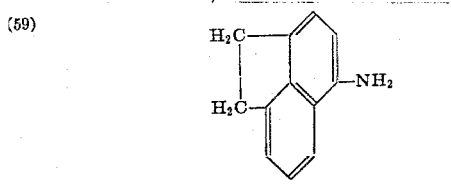

and the cyclisation to give the triazole compound of formula

is effected with oxidation, this acid is then optionally converted into the corresponding acid halide and this product condensed with an aminophenol of formula

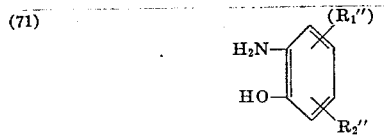

or

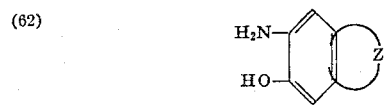

and subjected to a cyclisation reaction to give the oxazole ring under water-eliminating conditions, and, in the case of $n \neq 1$ either a after-sulphonation with sulphonating agents is carried out, or a corresponding aminophenol or amine containing 1 to 2 sulphone groups is used.

The new compounds defined above show a more or less pronounced fluorescence in the dissolved or finely divided state. They can be used for the optical brightening of the most diverse synthetic, semi-synthetic or natural organic materials or substances which contain such organic materials.

As examples of this, the following groups of organic materials may be mentioned, where optical brightening of these is relevant, without the following survey being intended to express any restriction thereto:

I. Synthetic organic high molecular materials:
a. Polymerisation products based on organic compounds containing at least one polymerisable carbon-carbon double bond, that is to say their homopolymers or copolymers as well as their after-treatment products such as for example crosslinking, grafting or degradation products, polymer dilutions or products obtained by modification of reactive groups, for example polymers based on $\alpha,\beta$-unsaturated carboxylic acids or derivatives of such carboxylic acids, especially on acrylic compounds (such as for example acrylic esters, acrylic acid, acrylonitrile, acrylamides and their derivatives or their methacrylic analogues), on olefine hydrocarbons (such as for example ethylene, propylene, styrenes or dienes, and also so-called ABS polymers), and polymers based on vinyl and vinylidene compounds (such as for example vinyl chloride, vinyl alcohol and vinylidene chloride), b. Polymerisation products which are obtainable by ring opening, for example polyamides of the polycaprolactam type, and also polymers which are obtainable both via polyaddition and polycondensation, such as polyethers or polyacetals, c. Polycondensation products or precondensates based on bifunctional or polyfunctional compounds with groups capable of condensation, their homocondensation and co-condensation products as well as products of after-treatment, such as for example polyesters, especially saturated polyesters (for example ethylene glycol terephthalic acid polyesters) or unsaturated polyesters (for example maleic acid-dialcohol polycondensates as well as their cross-linking products with copolymerisable vinyl monomers), unbranched polyesters as well as branched polyesters (also based on higher-functional alcohols, such as for example alkyl resins), polyesters, polyamides (for example hexamethylenediamine adipate), maleate resins, melamine resins, their precondensates and analogues, polycarbonates and silicones, d. Polyaddition products such as polyurethanes (crosslinked and not crosslinked), and epoxide resins. II. Semi-synthetic organic materials, for example cellulose esters of various degrees of esterification (so-called 2½-acetate and triacetate) or cellulose ethers, regenerated cellulose (viscose or cuprammonium cellulose) or their after-treatment products and casein plastics. III. Natural organic materials of animal or vegetable origin, for example based on cellulose or proteins such as cotton, wool, linen, silk, natural lacquer resins, starch and casein.

The organic materials to be optically brightened can belong to the most diverse processing states (raw materials, semi-finished goods or finished goods). They can, on the other hand, be in the form of the most diverse shaped structures, that is to say for example predominantly three-dimensional bodies such as sheets, profiles, injection mouldings, various machined articles, chips, granules or foams, and also as predominantly two-dimensional bodies such as films, foils, lacquers, coatings, impregnations and coverings, or as predominantly unidimensional bodies such as filaments, fibres, flocks and wires. The said materials can on the other hand also be in unshaped states, in the most diverse homogeneous or inhomogeneous forms of division, such as for example as powders, solutions, emulsions, dispersions, latices, pastes or waxes.

Fibre materials can for example be in the form of endless filaments (stretched or unstretched), staple fibres, flocks, hanks, textile filaments, yarns, threads, fibre fleeces, felts, waddings, flocked structures or as textile woven fabrics or textile laminates, knitted fabrics as well as papers, cardboards or paper compositions.

The compounds to be used according to the invention are of importance, inter alia, for the treatment of textile organic materials, especially woven textile fabrics. Where fibres which can be in the form of staple fibres or endless filaments and in the form of hanks, woven fabrics, knitted fabrics, fleeces, flocked substrates or laminates, are to be brightened optically in accordance with the invention, this is advantageously carried out in an aqueous medium, wherein the compounds in question are present in a finely divided form (suspensions, so-called micro-dispersions and optionally solutions). Dispersing agents, stabilisers, wetting agents and further auxiliary agents can optionally be added during the treatment.

Depending on the type of brightener compound used, it can prove advantageous to carry out the process in a neutral or alkaline or acid bath. The treatment is usually carried out at temperatures of about 20° to 140°C, for example at the boiling point of the bath or near this (about 90° C). It is also possible to use solutions or emulsions in organic solvents for the finishing of textile substrates in accordance with the invention, as is practised in the dyeing industry in so-called solvent dyeing (padder-thermofixing application, or exhaustion dyeing process in dyeing machines).

The new optical brighteners according to the present invention can furthermore be added to, or incorporated in, the materials before or during their shaping. Thus they can for example be added to the compression moulding composition or injection moulding composition during the manufacture of films, foils (for example milling into polyvinyl chloride whilst hot) or mouldings.

Where the shaping of fully synthetic or semi-synthetic organic materials is carried out by spinning processes or via spinning compositions, the optical brighteners can be applied in accordance with the following procedure:

Addition to the starting substances (for example monomers) or intermediate products (for example precondensates or prepolymers), that is to say before or during the polymerisation, polycondensation or polyaddition, sprinkling onto polymer chips or granules for spinning compositions, bath dyeing of polymer chips or granules for spinning compositions, metered addition to spinning melts or spinning solutions, or application to sinning tow before stretching.

The new optical brighteners according to the present invention can for example also be employed in the following use forms:

a. Mixtures with dyestuffs (shading) or pigments (coloured pigments or especially, for example, white pigments) or as an additive to dyebaths, printing, discharge or reserve pastes, and also for the after-treatment of dyeings, prints or discharge prints, b. mixed with so-called "carriers," wetting agents, plasticisers, swelling agents, antioxidants, light protection agents, heat stabilisers and chemical bleaching agents (chlorite bleach, bleaching bath additives), c. mixed with crosslinking agents or finishing agents (for example starch or synthetic finishing agents) and also in combination with the most diverse textile finishing processes, especially synthetic resin finishes (for example creaseproof finishes such as "wash-and-wear," "permanent press" and "no-iron"), also flameproof, soft handle, anti-soiling or antistatic finishes, or antimicrobial finishes, d. incorporation of the optical brighteners into polymeric carrier materials (polymerisation, polycondensation or polyaddition products) in a dissolved or dispersed form, for use in, for example, coating agents, impregnating agents or binders (solutions, dispersions or emulsions) for textiles, fleeces, paper and leather, e. as additives to so-called "master batches,"

f. as additives to the most diverse industrial products in order to render these more marketable (for example improving the appearance of soaps, detergents or pigments), g. in combination with other optically brightening substances, h. in spinning bath preparations, that is to say as additives to spinning baths such as are used to improve the slip for the further processing of synthetic fibres, or from a special bath before the esterification of the fibre, and i. as scintillators for various purposes of a photographic nature, such as for example for electrophotographic reproduction or super-sensitisation.

If the brightening process is combined with textile treatment or finishing methods, the combined treatment can in many cases be carried out advantageously with the aid of appropriate stable preparations which contain the optically brightening compounds in such concentration that the desired brightening effect is achieved.

In certain cases the brighteners are caused to be fully effective through an after-treatment. This can for example represent a chemical treatment (for example acid treatment), a thermal treatment (for example heat) or a combined chemical/thermal treatment. Thus, for example, the procedure followed when optically brightening a series of fibre substrates, for example of polyester fibres, with the brighteners according to the invention is appropriately to impregnate these fibres with the aqueous dispersions (optionally also solutions) of the brighteners at temperatures below 75° C, for example at room temperature, and to subject them to a dry heat treatment at temperatures above 100° C, it being generally advisable first still to dry the fibre material at a moderately elevated temperature, for example at not less than 60° up to about 130° C. The heat treatment in the dry state is then advantageously carried out at temperatures of between 120° and 225° C, for example while warming in a drying chamber, by ironing in the indicated temperature range or by treatment with dry superheated steam. The drying and the dry heat treatment can also be carried out in immediate succession or be combined into a single process step.

The amount of the new optical brighteners to be used according to the invention, relative to the material to be optically brightened, can vary within wide limits. A distinct and durable effect can already be achieved with very small amounts, in certain cases for example amounts of 0.0001 percent by weight. It is however also possible to use amounts of up to about 0.8 percent by weight and optionally up to about 2 percent by weight. For most practical purposes, amounts of between 0.0005 and 0.5 percent by weight are preferably of interest.

The new optical brighteners are also particularly suitable for use as additives for washing baths or to industrial and domestic detergents, and can be added in various ways. They are appropriately added to washing baths in the form of their solutions in water or organic solvents, or in a finely divided form as aqueous dispersions. They are advantageously added to domestic or industrial detergents in any stage of the process of manufacture of the detergent, for example to the so-called "slurry" before spray-drying the washing powder or in the preparation of liquid detergent combinations. The addition can be made both in the form of a solution or dispersion in water or other solvents and without an auxiliary agent, as the dry brightener powder. The brighteners can for example be mixed, kneaded or ground with the detergent substances and admixed to the finished washing powder in this way. They can however also be sprayed, as a solution or in a pre-dispersed form, onto the finished detergent.

Possible detergents are the known mixtures of detergent substances such as for example soap in the form of chips and powder, synthetics, soluble salts of sulphonic acid half-esters of higher fatty alcohols, higher arylsulphonic acids and/or alkylsulphonic acids with multiple alkyl substitution, sulphocarboxylic acid esters of medium to higher alcohols, fatty acid acylaminoalkyl- or acylaminoarylglycerinesulphonates, phosphoric acid esters of fatty alcohols and the like. Possible so-called "builders" are, for example, alkali polyphosphates and polymetaphosphates, alkali pyrophosphates, alkali salts of carboxymethylcellylose and other "soil redeposition inhibitors," and also alkali silicates, alkali carbonates, alkali borates, alkali perborates, nitrilotriacetic acid, ethylenediaminotetraacetic acid, and foam stabilisers such as alkanolamides of higher fatty acids. Furthermore, the detergents can for example contain the following:

antistatic agents, skin protection agents which restore fat, such as lanoline, enzymes, antimicrobial agents, perfumes and dyestuffs.

The new optical brighteners have the particular advantage that they are also effective in the presence of active chlorine donors, such as for example hypochlorite, and can be used without significant loss of the effects in washing baths with non-ionic detergents, for example alkylphenol polyglycol ethers.

The compounds according to the invention are added in amounts of 0.005 – 1 percent or above, relative to the weight of the liquid or pulverulent, finished detergent. Washing liquors which contain the indicated amounts of the optical brighteners claimed impart a brilliant appearance in daylight to textiles from cellulose fibres, polyamide fibres, cellulose fibres with a high quality finish, polyester fibres, wool and the like, when used in washing.

The washing treatment is for example carried out as follows:

The textiles indicated are treated for 1 to 30 minutes at 20° to 100° C in a washing bath which contains 1 to 10 g/kg of a built-up composite detergent and 0.05 to 1 percent, relative to the weight of the detergent, of the brighteners claimed. The liquor ratio can be 1:3 to 1:50. After washing, the usual rinsing and drying is carried out. The washing bath can contain 0.2 g/l of active chlorine (for example as hypochlorite) or 0.1 to 2 g/l of sodium perborate. as a bleaching additive.

In the examples parts, unless otherwise stated, are always parts by weight and percentages are always percentages by weight. Melting points and boiling points are uncorrected, unless otherwise noted.

EXAMPLE 1

5.12 g (0.0133 mol) of the acid chloride of formula (72)

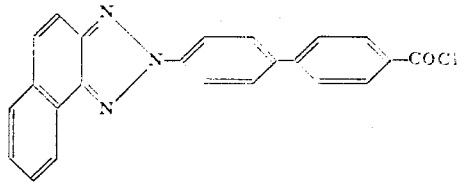

2.12 g (0.0133 mol) of 1-amino-2-hydroxy-naphthalene and 35 ml of o-dichlorobenzene are warmed to 200° C over the course of 3 hours in a stream of nitrogen, whereby a thick grey suspension is produced and some water distils off. After adding 30 ml of diethylene glycol dibutyl ether and 0.1 g of boric anhydride the mixture is further heated up to a temperature of 254° C over the course of 2 hours, with the trichlorobenzene distilling off, and this temperature is maintained for a further 4 hours. The mixture is allowed to cool and diluted with 40 ml of tetrachlorethylene, and the product is filtered off at room temperature, washed with carbon tetrachloride and dried in vacuo at 80° C, whereby 5.7 g (87 percent of theory) of the crude compound of formula (73)

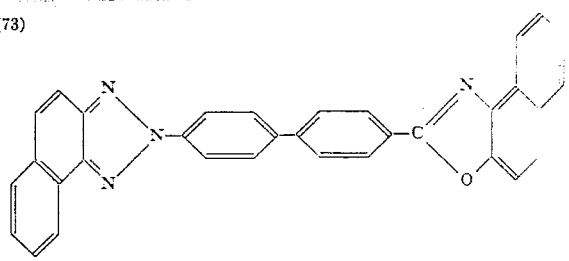

are obtained as a greenish-grey powder which does not melt below 360° C. Recrystallisation from a 50-fold amount of boiling trichlorobenzene with the aid of Fuller's earth yields light yellow crystals which do not melt below 360° C.

Analysis: $C_{33}H_{20}ON_4$. 1/6 mol of trichlorobenzene
calculated: C 78.70 H 3.98 N 10.81
found: C 78.65 H 3.79 N 10.78

If the 1-amino-2-hydroxy-naphthalene is replaced by the equivalent amount of 3-hydroxy-4-amino-diphenyl, the compound of formula (74)

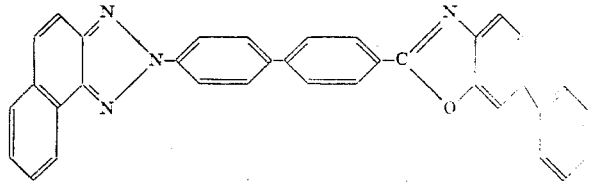

is obtained in similar yield, as pale yellow crystals of melting point 273° to 275° C (from o-dichlorobenzene)
Analysis: $C_{35}H_{22}ON_4$
Calculated: C 81.69 H 4.31 N 10.89
found: C 80.98 4.34 N 10.77

The acid chloride used as the starting material is manufactured as follows:

A solution of 24.96 g (1/10 mol) of the hydrochloride of 4-amino-diphenyl-4'-carboxylic acid in 80 ml of ice water, 20 g of concentrated hydrochloric acid and 50 g of glacial acetic acid are diazotised over the course of 1 hour, at 0 to 5° C, with a solution of 7 g of sodium nitrite in 70 ml of water, freed of small amounts of unconsumed nitrous acid after 1 hour by means of sulphamic acid, and the beige suspension added to 14.3 g (0.1 mol) of 2-amino-naphthalene dissolved in 200 ml of 5 percent strength hydrochloric acid. Thereafter a solution of 50 g of crystalline sodium acetate in 135 ml of water is added, and finally 65 ml of 30 percent strength sodium hydroxide solution are added. The mixture is stirred for a further 1½ hours at room temperature and the red dyestuff is filtered off, washed with water and dissolved, without drying, in 500 ml of pyridine. 1 l of 2 N javelle are added dropwise to the red solution at 89° C over the course of one hour, the mixture is subsequently stirred for a further 30 minutes at about 85° C and is then cooled to 20° C, and the product is filtered off. After washing with water and drying in vacuo at 80° C, 26.6 g (69 percent of theory) of the sodium salt of formula

(75) 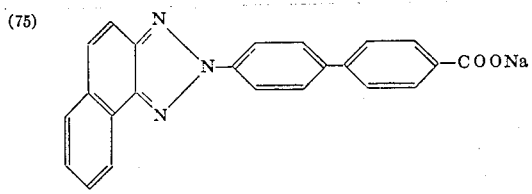

are obtained as a light brown finely crystalline powder.

19.35 g (1/20 mol) of the sodium salt are dissolved in 350 ml of chlorobenzene in the presence of 0.5 ml of dimethylformamide together with 60 ml of thionyl chloride at 95° C, with strong evolution of gas, and the solution is freed of sodium chloride which has separated out by filtering whilst hot. On cooling, the acid chloride precipitates in the form of practically colourless crystals which, after filtering off, washing with carbon tetrachloride and drying, weigh 13.0 g (68 percent of theory) and which melt at 228° to 231° C in an evacuated tube.

The following compounds can be manufactured analogously:

(76) 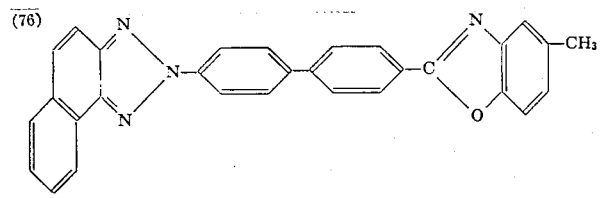

pale yellow crystals from dichlorobenzene; melting point: 283° to 284° C.

(77) 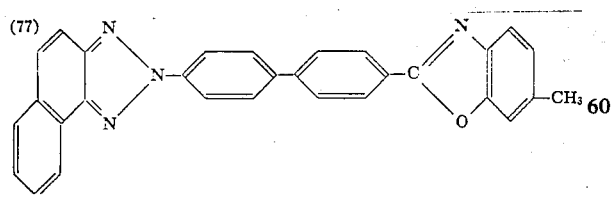

light yellow crystals from dichlorobenzene; melting point: 177° to 178° C.

(78) 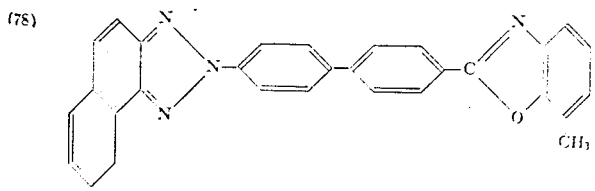

yellow crystals from dichlorobenzene; melting point: 193° to 194° C.

(79) 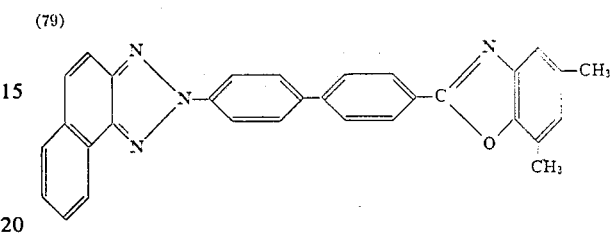

light yellow crystals from dichlorobenzene; melting point: 150° to 151° C.

(80) 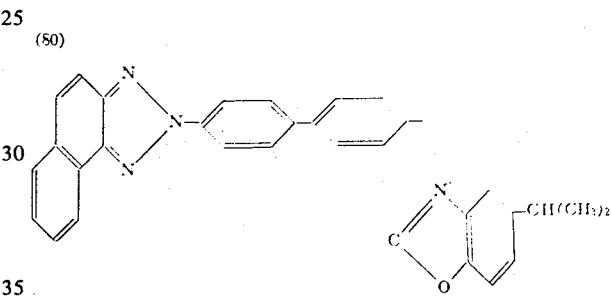

greenish-pale yellow crystals from dichlorobenzene; melting point: 249° to 250° C.

(81) 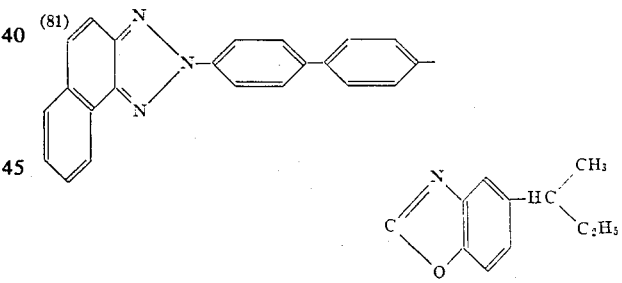

yellow crystals from dichlorobenzene; melting point: 216° to 216.5° C.

(82) 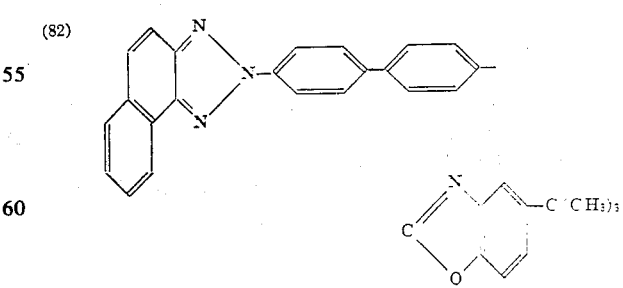

yellow crystals from trichlorobenzene; melting point: 238° to 239° C.

(83)

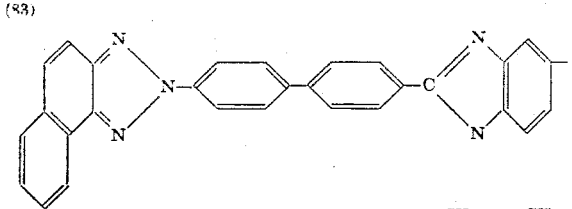

light yellow crystals from dichlorobenzene; melting point: 180° to 181° C.

(84)

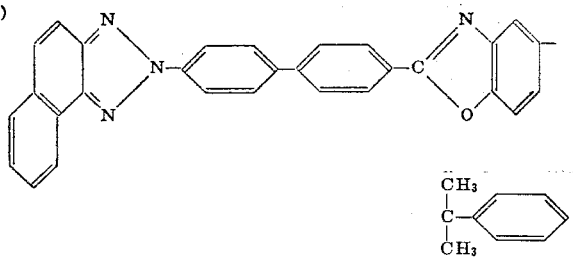

light yellow crystals from dichlorobenzene; melting point: 242° to 244° C.

(85)

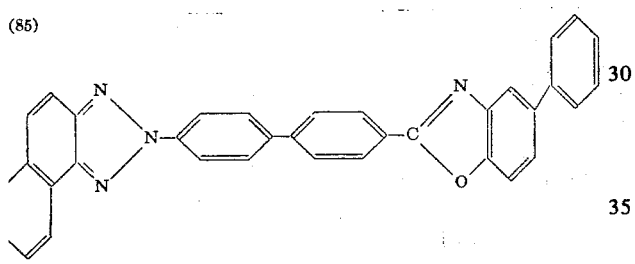

yellow crystals from trichlorobenzene; melting point: 273° to 275° C.

(86)

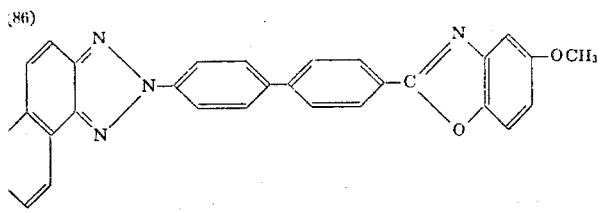

light yellow crystals from dichlorobenzene; melting point: 251° to 252° C.

(87)

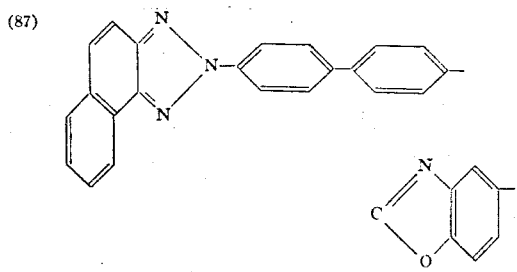

pale yellow crystals from dichlorobenzene; melting point: 170° to 171° C.

EXAMPLE 2

If the procedure indicated in Example 1 is followed but using the amines of formulae

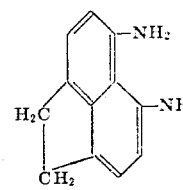 (88) or (89) 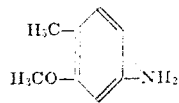

as coupling components instead of 2-aminonaphthalene, the dye-stuffs of formulae (90)

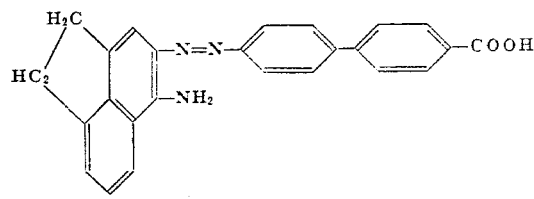

or (91)

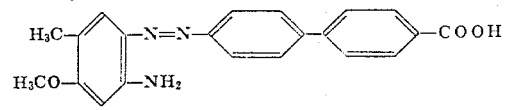

are respectively obtained, and these can be oxidised with copper-II acetate in pyridine to give the triazoles of formulae (92)

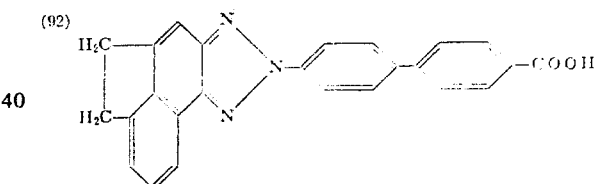

or (93)

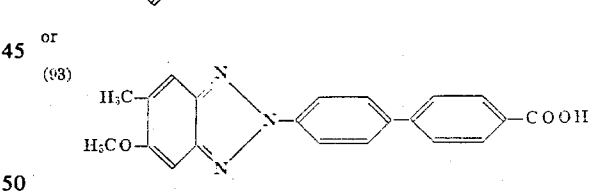

respectively.

From these the benzoxazoles of formulae (94)

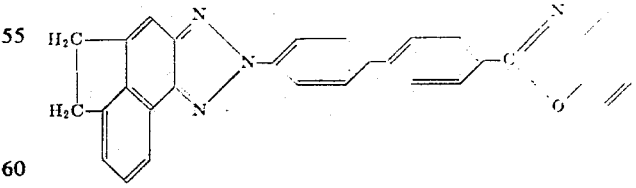

yellow crystals from chlorobenzene of melting point 292° to 293° C

(95)
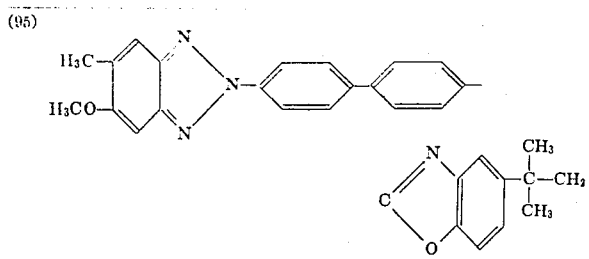

pale yellow crystals from tetrachlorethylene; melting point: 271° to 272° C, are obtained, for example via the acid chlorides manufactured in situ.

EXAMPLE 3

3.93 g (0.01 mol) of the compound of formula

(96)
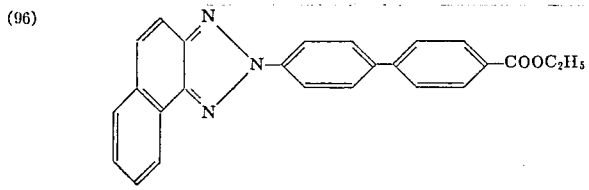

and 2.69 g (0.01 mol) of 2-aminophenol-4,6-disulphonic acid are heated in 30 g of polyphosphoric acid of 85 percent $P_2O_5$ content, in a stream of nitrogen, to 130° C over the course of 2 hours and subsequently stirred for a further 20 hours at this temperature. The resulting yellow, thick suspension is diluted with 100 ml of water after cooling, heated to the boil with 100 ml of concentrated hydrochloric acid to improve the filtrability, and the product filtered off and washed with water. After drying in vacuo at 70° C, 4.7 g (78.5 percent of theory) of the compound of formula

(97)
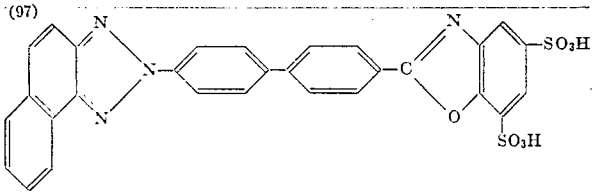

are obtained as a pale yellow powder. Recrystallisation from dimethylformamide after purifying with active charcoal yields the bis-dimethylammonium salt in the form of beige crystals which do not contain any water of crystallisation.

The compound of formula

(98)
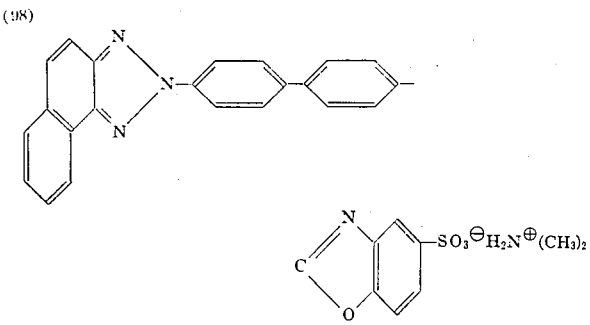

is obtained analogously as beige crystals containing 0.5 mol of water of crystallisation.

The ethyl ester used as the starting material is obtained from the acid chloride described in Example 1 by boiling in ethanol. Pale yellow crystals of melting point 158° to 160° C.

EXAMPLE 4

2.9 g (0.008 mol) of the compound of formula

(99)
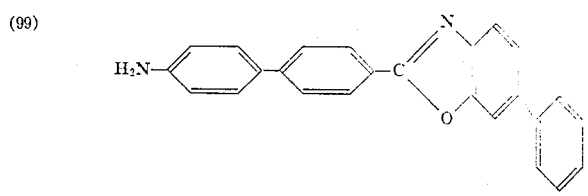

are stirred for 20 hours at room temperature with 1.22 g (0.008 mol) of 2-nitroso-nitrobenzene in 80 ml of glacial acetic acid, and the mixture is then briefly warmed to 115° C, cooled and mixed with 300 ml of water. After filtering, washing with water and drying, 3.1 g of the azo dyestuff of formula (100)
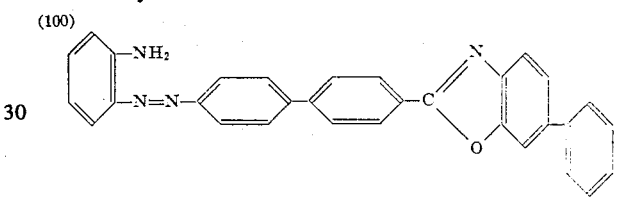

are obtained as a brown powder which is cyclised, without purification, by 16 hours' boiling in 50 ml of triethyl phosphite under reflux. After cooling, filtering, washing with ethanol and drying, 2.3 g (62 percent of theory via both steps) of the benzotriazole of formula (101)
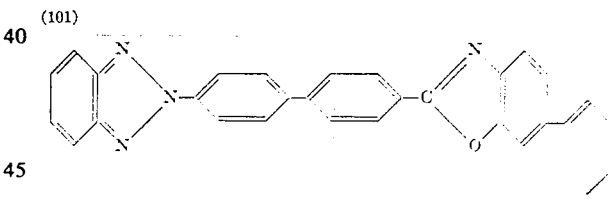

are obtained as a grey powder of melting point 296° to 300° C. Recrystallisation from dichlorobenzene with the aid of Fuller's earth yields pale yellow crystals of melting point 310° to 312° C.

The amine used as the starting material is obtained in the following manner:

4-Nitrodiphenyl-4'-carboxylic acid chloride is reacted in the customary manner with 3-hydroxy-4-aminodiphenyl to give the benzoxazole of formula (102)
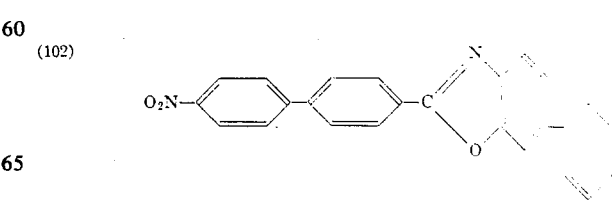

(light green crystals of melting point 245° to 248° C), from which the desired amine is produced by catalytic hydrogenation in dimethylformamide in the presence of palladium on charcoal. Greenish crystals of melting point 198° to 200° C.

EXAMPLE 5

A polyester woven fabric is padded at room temperature with an aqueous solution which per litre contains 2 g of a compound of formula (74) as well as 1 g of an addition product of about 8 mols of ethylene oxide to 1 mol of p-tert.-octylphenol, and is dried at about 100° C. The dry material is subsequently subjected to a heat treatment at 150° to 220° C, which depending on the temperature lasts for 2 minutes to a few seconds. The material treated in this way has a significantly whiter appearance than the untreated material.

The compounds of formulae (86), (78), (77), (76), (79), (83), (80), (81), (82) or (87) can be used in an entirely corresponding manner, with a similar effect being achieved.

EXAMPLE 6

100 parts of polyester granules of terephthalic acid ethylene glycol polyester are intimately mixed with 0.05 parts of a compound of formula (73) or (74) in a tumbler vessel. The mixture is fused at 285° C whilst stirring and is spun through customary spinnerets. Strongly brightened polyester fibres are obtained. The compound mentioned can also already be added before or during the polycondensation to give the polyester.

EXAMPLE 7

A bleached woven fabric of polyamide staple fibre (spun nylon) is treated for 30 minutes at 90° to 95° C, using a liquor ratio of 1:30, in a bath which contains 0.1 percent of the compound of formula (74) and 1 percent of 40 percent strength acetic acid, relative to the fibre material. After rinsing and drying, the woven fabric treated in this way shows a strong brightening.

The compounds of formulae (79), (86) (97) or (98) can be used in an entirely similar manner.

We claim:

1. A diphenyl derivative, which corresponds to the formula

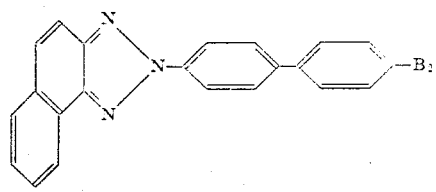

wherein $B_2$ represents a radical

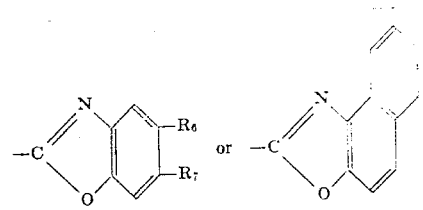

wherein $R_6$ represents hydrogen, alkyl with 1 to 4 carbon atoms or alkoxy with 1 to 4 carbon atoms, and $R_7$ represents hydrogen, alkyl with 1 to 4 carbon atoms, alkoxy with 1 to 4 carbon atoms or phenyl.

2. A compound corresponding to the formula

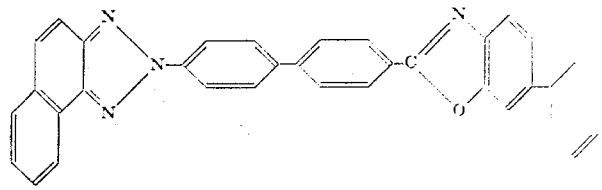

* * * * *